(12) United States Patent
Hartwich et al.

(10) Patent No.: US 8,095,740 B2
(45) Date of Patent: Jan. 10, 2012

(54) METHOD AND APPARATUS FOR ACCESSING DATA OF A MESSAGE MEMORY OF A COMMUNICATION MODULE

(75) Inventors: Florian Hartwich, Reutlingen (DE); Christian Horst, Dusslingen (DE); Franz Bailer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 930 days.

(21) Appl. No.: 11/659,171

(22) PCT Filed: Jun. 29, 2005

(86) PCT No.: PCT/EP2005/053077
§ 371 (c)(1),
(2), (4) Date: Apr. 24, 2008

(87) PCT Pub. No.: WO2006/015911
PCT Pub. Date: Feb. 16, 2006

(65) Prior Publication Data
US 2008/0282041 A1    Nov. 13, 2008

(30) Foreign Application Priority Data
Aug. 5, 2004   (DE) .......................... 10 2004 038 213

(51) Int. Cl.
*G06F 12/00* (2006.01)
*G06F 3/00* (2006.01)

(52) U.S. Cl. ............ 711/147; 711/150; 710/52; 710/56; 709/200; 709/201; 709/220; 709/221; 709/223; 709/224; 709/225; 709/250; 709/251; 370/282; 370/463

(58) Field of Classification Search .................. None
See application file for complete search history.

(56) References Cited

U.S. PATENT DOCUMENTS

| 5,127,002 A | * | 6/1992 | Shaik et al. | .................. 370/458 |
| 5,195,182 A | * | 3/1993 | Sasson | ............................ 710/53 |

(Continued)

FOREIGN PATENT DOCUMENTS
EP          0 593 195         4/1994
(Continued)

OTHER PUBLICATIONS

'CMOS RAM Bank 0' by Walsh Computer Technology, from www.walshcomptech.com published on May 15, 2003.*

*Primary Examiner* — Henry W. H. Tsai
*Assistant Examiner* — Steven Snyder
(74) *Attorney, Agent, or Firm* — Kenyon & Kenyon LLP

(57) ABSTRACT

A method and an apparatus for accessing data of a message memory of a communication module by inputting or outputting data into or from the message memory, the message memory being connected to a buffer memory assemblage and the data being transferred to the message memory or from the message memory, the buffer memory assemblage having an input buffer memory in the first transfer direction and an output buffer memory in the second transfer direction; and the input buffer memory and the output buffer memory each being divided into a partial buffer memory and a shadow memory, the following steps being performed in each transfer direction: inputting data into the respective partial buffer memory, and transposing access to the partial buffer memory and shadow memory, so that subsequent data can be inputted into the shadow memory while the previously inputted data are already being outputted from the partial buffer memory in the stipulated transfer direction.

11 Claims, 11 Drawing Sheets

U.S. PATENT DOCUMENTS

| | | | |
|---|---|---|---|
| 5,432,909 A * | 7/1995 | Cok | 709/251 |
| 5,649,148 A | 7/1997 | Gresham | 395/427 |
| 5,687,316 A * | 11/1997 | Graziano et al. | 709/250 |
| 5,805,927 A * | 9/1998 | Bowes et al. | 710/23 |
| 5,958,029 A * | 9/1999 | McKinnon | 710/100 |
| 6,081,847 A * | 6/2000 | Lin | 709/250 |
| 6,480,908 B1 * | 11/2002 | Pan et al. | 710/19 |
| 7,281,102 B1 * | 10/2007 | Agesen et al. | 711/163 |
| 7,426,588 B2 * | 9/2008 | Hirako et al. | 710/22 |
| 7,506,122 B1 * | 3/2009 | Agesen et al. | 711/163 |
| 2001/0014930 A1 * | 8/2001 | Soderquist | 711/109 |
| 2003/0174708 A1 | 9/2003 | Van Asten | 370/395.7 |
| 2004/0064578 A1 * | 4/2004 | Boucher et al. | 709/236 |
| 2005/0097273 A1 * | 5/2005 | Kanai | 711/114 |
| 2006/0282640 A1 * | 12/2006 | Fuhrmann | 711/171 |

FOREIGN PATENT DOCUMENTS

| | | |
|---|---|---|
| EP | 1355456 A1 * | 10/2003 |
| JP | 61 58359 | 3/1986 |
| RU | 2231112 | 6/2004 |
| WO | WO 01/05123 | 1/2001 |
| WO | WO 01/86869 | 11/2001 |

* cited by examiner

METHOD AND APPARATUS FOR ACCESSING DATA OF A MESSAGE MEMORY OF A COMMUNICATION MODULE

FIELD OF THE INVENTION

The present invention relates to a method and an apparatus for accessing data of a message memory of a communication module by inputting or outputting data into or from the message memory.

BACKGROUND INFORMATION

In the design of modern motor vehicles and also in mechanical engineering, e.g., in the machine-tool sector, and therefore also in automation, the networking of control devices, sensor apparatus, and actuator apparatus with the aid of a communication system and a bus system, i.e., a communication connection, has drastically increased in recent years. Synergistic effects can be achieved by distributing functions among multiple control devices, the term "distributed systems" being used. Communication among different stations takes place more and more via a bus system, i.e. a communication system. Communication traffic on the bus system, access and reception mechanisms, and error handling are regulated by way of a protocol. A known protocol for this purpose is the CAN protocol or the TTCAN protocol, as well as the FlexRay protocol, e.g., the FlexRay protocol specification v. 2.0. FlexRay is a fast, deterministic, and error-tolerant bus system for use in particular in a motor vehicle. The FlexRay protocol operates with the time division multiple access (TDMA) method; the components, i.e., subscribers and messages to be transferred, are assigned fixed time slots in which they have exclusive access to the communication connection. This is also implemented in comparable fashion in TTCAN. The time slots repeat in a defined cycle, so that the point in time at which a message is transferred via the bus can be exactly predicted, and bus access occurs deterministically. To optimize the utilization of bandwidth for message transfer on the bus system, FlexRay divides the cycle into a static and a dynamic part. The fixed time slots are located in the static part at the beginning of a bus cycle. The time slots are allocated dynamically in the dynamic part, and exclusive bus access is enabled in them only for a short period in each case ("mini-slots"). Only when a bus access occurs within a mini-slot is the time slot lengthened by the requisite amount. The result is that bandwidth is consumed only when it is actually needed. FlexRay communicates via two physically separate lines, each having a maximum data rate of 10 MB per second. The two channels correspond to the physical layer of, in particular, the Open System Architecture (OSI) layer model. These channels serve principally for redundant (and therefore error-tolerant) transfer of messages, although different messages can also be transferred, which would then result in a doubling of the data rate. FlexRay can also, however, be operated at lower data rates.

In order to implement synchronous functions and to optimize bandwidth by way of small spacings between two messages, the distributed components in the communication network, i.e., the subscribers, require a shared time base (called "global time"). For clock synchronization purposes, synchronization bulletins are transferred in the static part of the cycle; using a special algorithm meeting the FlexRay specification, the local clock time of a component is corrected in such a way that all the local clocks run synchronously with a global clock. This synchronization is also accomplished in comparable fashion in a TTCAN network.

A FlexRay network node or FlexRay subscriber or host contains a subscriber processor, i.e., the host processor, a FlexRay controller or communication controller, and (in the context of bus monitoring) a bus guardian. The host processor, i.e., the subscriber processor, furnishes and processes the data that are transferred via the FlexRay communication controller. For communication in a FlexRay network, messages or message objects can be configured with, for example, up to 254 data bytes. A communication module, in particular a communication controller, is then used to transfer these messages or message objects between the physical layer (i.e. the communication connection) and the host processor.

Accesses to the message memory of a communication module of, in particular, a FlexRay communication controller occur both by way of the host processor unit, i.e. the host CPU, and via interface modules to the physical layer. Access to the host CPU encompasses the writing and reading of configuration data, status data, and the actual data to be sent. Access to the interface modules to the physical layer encompasses the reading of transmission messages and the storage of received messages; in both cases, the integrity of the messages must be ensured by way of suitable actions.

It is therefore an object of the invention to optimize data transfer between the host CPU, i.e., the subscriber processor, and the message memory in terms of transfer speed and data integrity.

SUMMARY

The present invention provides a method and an apparatus for accessing data of a message memory of a communication module by inputting or outputting data into or from the message memory, the message memory being connected to a buffer memory assemblage and the data being transferred in a first transfer direction to the message memory and in a second transfer direction from the message memory, the buffer memory assemblage having an input buffer memory in the first transfer direction and an output buffer member in the second transfer direction; and the input buffer memory and the output buffer memory are advantageously each divided into a partial buffer memory and a shadow memory for the partial buffer memory, the following steps being executed in each transfer direction: inputting data into the respective partial buffer memory, and transposing access to the partial buffer memory and shadow memory, so that subsequent data can be inputted into the shadow memory while the inputted data are already being outputted from the partial buffer memory in the stipulated transfer direction. According to the present invention, a buffer memory assemblage for accessing data of a message memory of a communication module is therefore introduced, having an input buffer memory and an output buffer memory, the input buffer memory containing a first partial buffer memory and a first shadow memory, and the output buffer memory containing a second partial buffer memory and a second shadow memory, first means being provided with which access to the first partial buffer memory and to the first shadow memory is transposed, and second means being provided with which access to the second partial buffer memory and to the second shadow memory is transposed.

Advantageously, therefore, a buffer memory is provided for accessing data of a message memory of a communication module, the buffer memory containing a partial buffer memory and a shadow memory of the partial buffer memory, and means being provided with which access to the partial buffer memory and to the shadow memory is transposed.

In other words, the present invention provides a method and an apparatus for decoupling data transfers between the host CPU and the message memory from the accesses of the transmission and reception units, by interposing a buffer memory assemblage, e.g., an input buffer for writing and an output buffer for reading. The message handler thus, in particular, controls and monitors all the accesses relevant to the message memory, thereby ensuring the requisite data integrity of the stored messages. The invention presented here has the further advantage that the transfer speed can be greatly enhanced by way of this transposition, and that the splitting of the buffer memory into two makes possible reciprocal writing and reading, so that simultaneous access to the same memory cells during data transfer is omitted, and data integrity is thus assured.

Advantageously, the transposition to the partial buffer memory and shadow memory is indicated by an identifier or, in example embodiment, is initiated by the identifier.

It is useful if the data are transferred in messages, and if the messages are equipped with a message identifier, the transposition of access to the partial buffer memory and to the shadow memory occurring when the message identifier is written into a definable register.

It is particularly advantageous in this context that the data in a message are divided at least into first data, i.e., configuration data and status data, and second data, i.e., the actual data to be transferred, either only the first data or only the second data or first and second data being transferred as a function of at least one data identifier.

It is useful if access to the data is indicated by way of an access identifier that is entered in a register. Advantageously, information can be ascertained, from the access identifier itself or from its position in the register, as to which partial buffer memory or which shadow memory is currently being accessed.

It is useful if, upon the transposition of access, register entries, in particular aforesaid identifiers, in registers are also at least in part transposed.

A switchover identifier can be usefully provided in order to initiate the transposition of access to the partial buffer memory and to the shadow memory.

It is additionally useful if, for at least one transfer direction, a start identifier is entered in a register when the data are to be written into a memory.

This invention, with the buffer memory assemblage and the input and output buffer memories contained therein, as well as the access transposition, ensures that a host CPU can access the message memory without interruption despite latency times within the module. With the optimum memory utilization and absence of interruption, on the one hand the transfer speed is increased, and at the same time the invention ensures data integrity.

DETAILED DESCRIPTION

Figure 1:
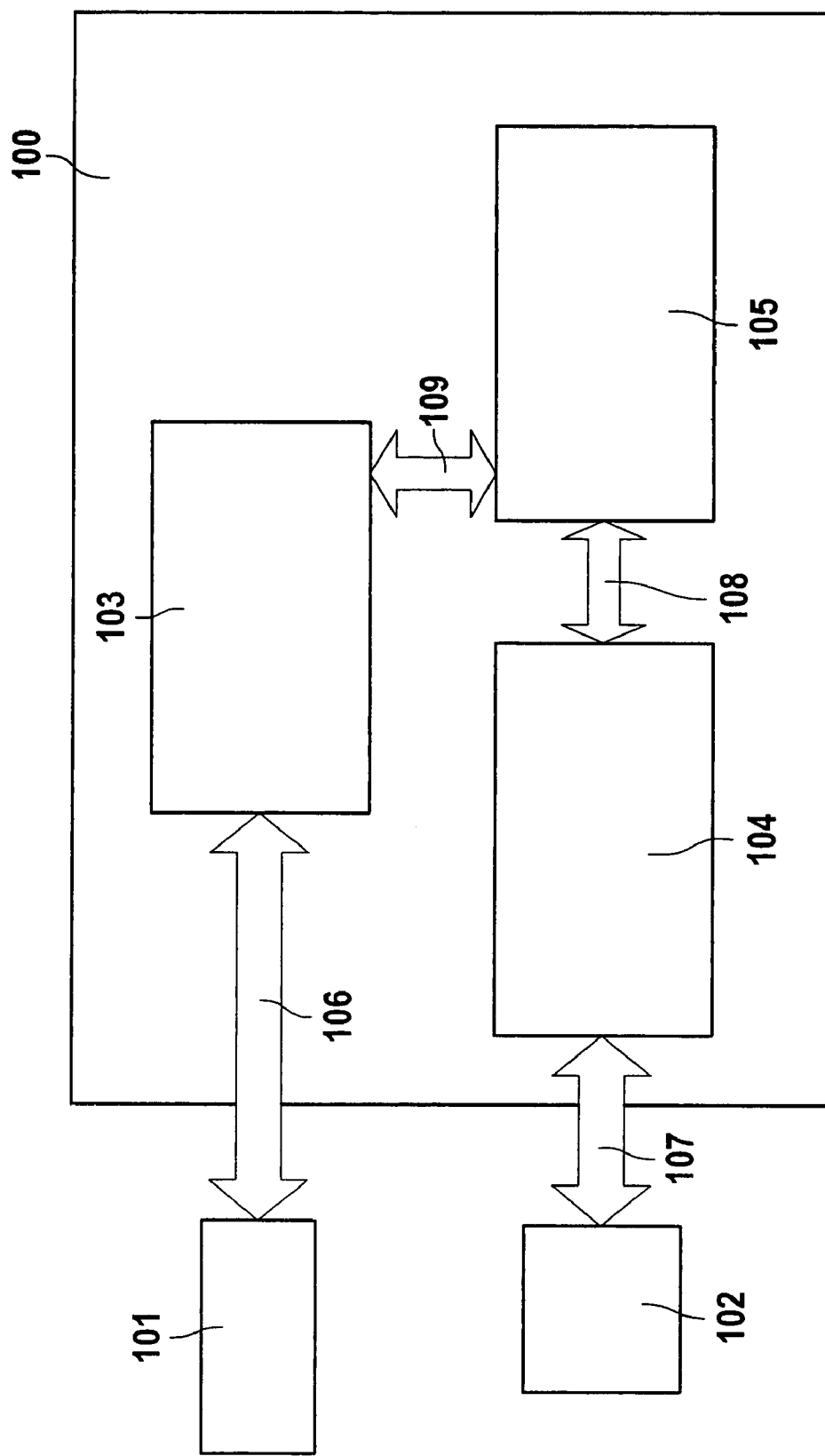
FIG. 1 schematically depicts the communication module and its linkage to the physical layer, i.e., the communication connection, and to the communication subscriber or host subscriber.

FIG. 1 schematically shows a FlexRay communication module 100 for linking a subscriber or host 102 to a FlexRay communication connection 101, i.e., to the FlexRay physical layer. For that purpose, FlexRay communication module 100 is connected via a connection 107 to subscriber or subscriber processor 102, and via a connection 106 to communication connection 101. For problem-free linkage on the one hand in terms of transfer times and on the other hand in terms of data integrity, a schematic distinction is made between, substantially, three assemblages in the FlexRay communication module. A first assemblage 105 serves for storage, in particular for buffering, of at least a portion of the messages to be transferred. Between subscriber 102 and this first assemblage 105, a second assemblage 104 is introduced via connections 107 and 108. A third assemblage 103 is likewise introduced, via connections 106 and 109, between subscriber 101 and first assemblage 105; the result is that very flexible inputting and outputting of data as parts of messages, in particular FlexRay messages, into and out of first assemblage 105 can be achieved, ensuring data integrity along with optimum speed.

Figure 2:
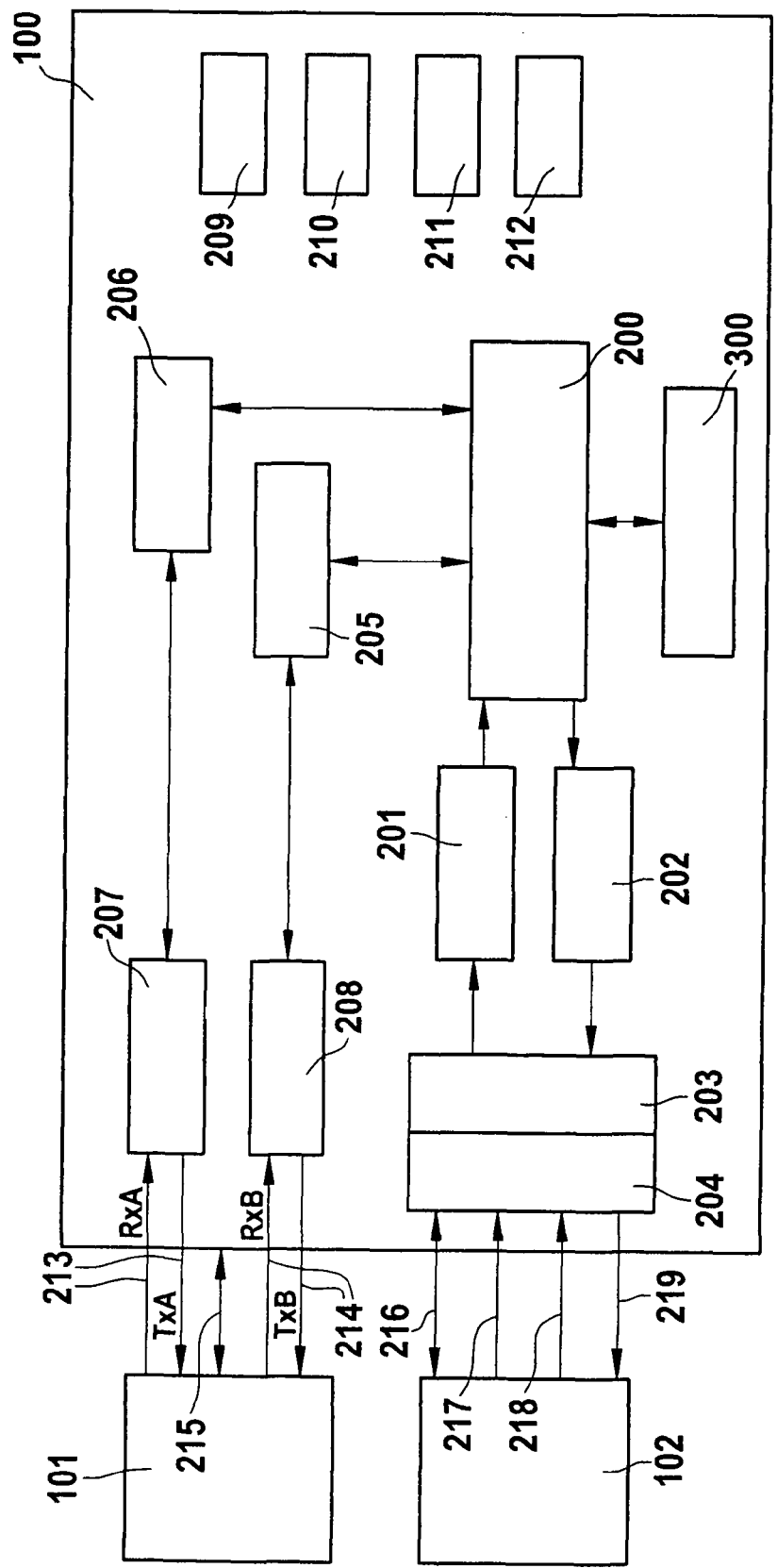
FIG. 2 depicts in greater detail an example embodiment of the communication module of FIG. 1 and its linkage.

FIG. 2 depicts this communication module 100 in an example embodiment, in more detail. The respective connections 106 to 109 are also depicted in more detail. Second assemblage 104 contains an input buffer memory 201 (input buffer IBF), an output buffer memory 202 (output buffer OBF), and an interface module made up of two parts 203 and 204, the one sub-module 203 being subscriber-independent and the second sub-module 204 being subscriber-specific. Subscriber-specific sub-module 204 (customer CPU interface, CIF) connects a subscriber-specific host CPU 102, i.e., a customer-specific subscriber, to the FlexRay communication module. A bidirectional data line 216, an address line 217, and a control input 218 are provided for this purpose. An interrupt output 219 is also provided. Subscriber-specific sub-module 204 is connected to a subscriber-independent sub-module 203 (generic CPU interface, GIF), i.e., the FlexRay communication module or the FlexRay IP module possesses a generic CPU interface to which a large number of different customer-specific host CPUs can connect via corresponding subscriber-specific sub-modules, i.e., customer CPU interfaces or CIFs. The result is that only sub-module 204 needs to be varied as a function of the subscriber, meaning much less complexity.

Input buffer memory 201 and output buffer memory 202 can be embodied in one memory module or also in separate memory modules. Input buffer memory 201 serves to buffer messages for transfer to message memory 200. The input buffer module is embodied in such a way that it can store two complete messages each made up of a header segment having, e.g., configuration data, and a data segment or payload segment. The input buffer memory is embodied in two parts (partial buffer memory and shadow memory), allowing the transfer between subscriber CPU 102 and message memory 200 to be accelerated by alternate writing to the two parts of the input buffer memory or by alternating access. The output buffer memory (output buffer, OBF) likewise serves to buffer messages for transfer from message memory 200 to subscriber CPU 102. Output buffer 202 is also configured in such a way that two complete messages made up of a header segment having, in particular, configuration data, and a data segment or payload segment, can be stored.

Here again, output buffer memory 202 is divided into two parts, a partial buffer memory and a shadow memory, so that here again the transfer between subscriber CPU or host CPU 102 and message memory 200 can be accelerated by alternate reading of the two parts of the transmission or by alternating access. This second assemblage 104, made up of blocks 201 to 204, is connected to first assemblage 105 in the manner depicted.

Assemblage 105 is made up of a message handler 200 (MHD) and a message memory 300 (message RAM). The message handler monitors and controls the data transfer between input buffer memory 201 and output buffer memory 202, and message memory 300. It likewise monitors and controls data transfer in the other direction via third assemblage 103. The message memory is embodied as single-ported RAM. This RAM stores the messages or message objects, i.e., the actual data, together with configuration data and status data. The exact structure of message memory 300 is depicted in more detail in FIG. 3.

Third assemblage 103 is made up of blocks 205 to 208. Corresponding to the two channels of the FlexRay physical layer, this assemblage 103 is divided into two data paths each having two data directions. This is indicated by connections 213 and 214, in which the two data directions for channel A—RxA and TxA for receiving (RxA) and transmitting (TxA)—and for channel B (RxB and TxB) are depicted. Connection 215 denotes an optional bidirectional control input. Third assemblage 103 is linked by way of a first buffer memory 205 for channel B and a second buffer memory 206 for channel A. These two buffer memories (transient buffer RAMs, RAM A and RAM B) serve as buffers for data transfer from and to first assemblage 105. Corresponding to the two channels, these two buffer memories 205 and 206 are connected to respective interface modules 207, 208 that contain the FlexRay protocol controller or bus protocol controller, made up of a transmit/receive shift register and the FlexRay protocol finite-state machine. The two buffer memories 205 and 206 thus serve as buffers for data transfer between the shift registers of the interface modules or FlexRay protocol controllers 207 and 208, and message memory 300. Here again, the data fields, i.e., the payload segment or data segment, of two FlexRay messages are advantageously stored by each buffer memory 205 or 206.

Also depicted in communication module 100 is the global time unit (GTU), designated 209, which is responsible for representing the global time interval pattern in FlexRay, i.e., the microtick μT and macrotick MT. Global time unit 209 also regulates error-tolerant clock synchronization of the cycle counter, and controls time-related operations in the static and dynamic segments of FlexRay.

Block 210 represents the general system controller (system universal control, SUC), which monitors and controls the operating modes of the FlexRay communication controller. These include wakeup, startup, reintegration and integration, normal operation, and passive operation.

Block 211 depicts the network and error management (NEM) function that is described in FlexRay protocol specification v. 2.0. Lastly, block 212 depicts the interrupt control system (interrupt control, INT), which manages the status and error interrupt flags and monitors and controls interrupt outputs 219 to subscriber CPU 102. Block 212 furthermore contains an absolute and a relative timer to generate timer interrupts.

For communication in a FlexRay network, message objects or messages (message buffers) can be configured with up to 254 data bytes. Message memory 300 is, e.g., a message RAM that can store, for example, up to a maximum of 64 message objects. All functions that are relevant to handling or management of the messages themselves are implemented in message handler 200. These are, for example, acceptance filtering, transfer of messages between the two FlexRay protocol controller blocks 207 and 208 and message memory 300 (i.e., the message RAM), as well as monitoring the transmission sequence and supplying configuration data or status data.

An external CPU, i.e., an external processor (subscriber processor 102), can directly access the registers of the FlexRay communication module via the subscriber interface using subscriber-specific part 204. A plurality of registers are used in this context. These registers are used to configure and control: the FlexRay protocol controller, i.e., interface modules 207 and 208; message handler (MHD) 200; global time unit (GTU) 209; general system controller (system universal controller, SUC) 210; network and error management unit (NEM) 211; interrupt controller (INT) 212; and access to the message RAM, i.e., message memory 300; and also to indicate corresponding status. At least some of these registers will be additionally discussed in further detail in FIGS. 4 to 6 and 7 to 9. A FlexRay communication module according to the present invention as just described allows easy implementation of the FlexRay specification v. 2.0, so that an ASIC or a microcontroller having corresponding FlexRay functionality can easily be generated.

Figure 3:
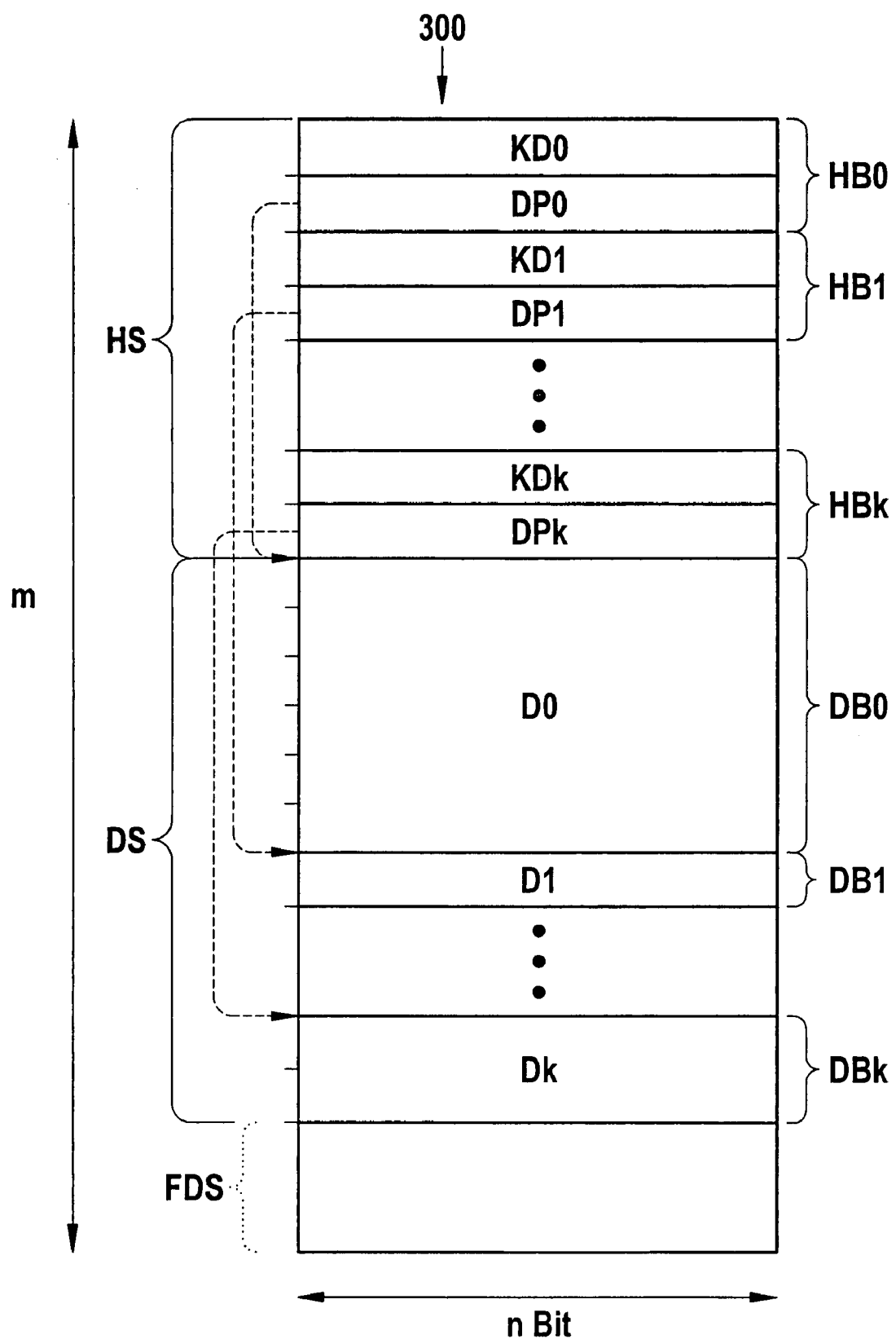
FIG. 3 depicts the structure of the message memory.

FIG. 3 describes in detail the subdivision of message memory 300. The functionality of a FlexRay communication controller required according to the FlexRay protocol specification requires a message memory in order to supply messages to be transmitted (transmit buffer) and to store messages received in error-free fashion (receive buffer). A FlexRay protocol permits messages having a data region, i.e., a payload region, of 0 to 254 bytes. As depicted in FIG. 2, the message memory is part of FlexRay communication module 100. The method described below, and the corresponding message memory, describe the storage of messages to be transmitted and of received messages, using e.g., a random access memory (RAM), it being possible, by way of the mechanism according to the present invention, to store a variable number of messages in a message memory of predetermined size. The number of storable messages depends on the size of the data regions of the individual messages, with the result that on the one hand the size of the memory required can be minimized without limiting the size of the messages, data regions, and on the other hand memory is optimally utilized. This variable division of an, in particular, RAM-based message memory for a FlexRay communication controller will be described below.

For implementation, a message memory having a defined word width of n bits, for example 8, 16, 32, etc., and a predetermined memory depth of m words, will be stipulated by way of example (m, n being natural numbers). Message memory 300 is divided into two segments, a header segment HS and a data segment DS (payload section, payload segment). A header region HB and a data region DB are therefore set up for each message. For messages 0, 1 to k (k being a natural number), header regions HB0, HB1 to HBk, and data regions DB0, DB1 to DBk are therefore set up. A distinction is therefore made in a message between first and second data, the first data corresponding to configuration data and/or status data relevant to the FlexRay message and being stored in a respective header region HB (HB0, HB1, ..., HBk). The second data, which correspond to the actual data that are to be transferred, are correspondingly stored in data regions DB (DB0, DB1, ..., DBk). The result is thus to create a first data quantity (measured in bits, bytes, or memory words) for the first data or each message, and a second data quantity (likewise measured in bits, bytes, or memory words) for the second data of a message; the second data quantity can be different for each message. The division between header segment HS and data segment DS is thus variable in message memory 300, i.e., there is no predetermined boundary between the regions. The division between header segment HS and data segment DS depends, according to the present invention, on the number k of messages and on the second data quantity, i.e., the volume of actual data, of one message or of all k messages together.

According to the present invention, a pointer element or data pointer DP0, DP1 to DPk is directly associated with each of the configuration data KD0, KD1 to KDk of the respective message. In this specific configuration, a fixed number of memory words (in this case, two) are associated with each header region HB0, HB1 to HBk, so that one configuration datum KD (KD0, KD1, ..., KDk) and one pointer element DP (DP0, DP1, ..., DPk) are always stored together in one header region HB. Adjoining this header segment HS having header regions HB, the size or first data quantity of which segment depends on the number k of messages to be stored, is data segment DS for storing the actual message data D0, D1 to Dk. This data segment (or data section) DS depends, in terms of its data quantity, on the respective data quantities of the stored message data, e.g., in this case six words in DB0, one word in DB1, and two words in DBk. The respective pointer elements DP0, DP1 to DPk thus always point to the beginning, i.e., to the starting address, of the respective data region DB0, DB1 to DBk in which the data D0, D1 to Dk of the respective messages 0, 1 to k are stored. The division of the message memory between header segment HS and data segment DS is therefore variable, and depends on the number of messages themselves and on the particular data quantity of a message and thus on the entire second data quantity. If fewer message are configured, the header segment becomes smaller and the region made available in the message memory can be used as an addition to data segment DS for storing data. This variability means that optimum memory utilization can be guaranteed, thus also allowing the use of smaller memories. The free data segment FDS, in particular its size, which is likewise dependent on the combination of the number k of stored messages and the respective second data quantity of the messages, is therefore minimal and can even become zero.

In addition to the use of pointer elements, it is also possible to store the first and second data, i.e., the configuration data KD (KD0, KD1, ..., KDk) and the actual data D (D0, D1, ..., Dk), in a predetermined sequence, so that the sequence of header regions HB0 to HBk in header segment HS, and the sequence of data regions DB0 to DBk in data segment DS, are identical in each case. In some circumstances it then might even be possible to dispense with a pointer element.

In an example embodiment, the message memory has associated with it an error identifier generator, e.g., a parity bit generator element, and an error identifier checker, in particular a parity bit check element, in order to ensure the correctness of the data stored in the HS and DS by the fact that a checksum, in particular constituted by a parity bit, can also be stored for each memory word or for each region (HB and/or DB). Other check identifiers, e.g., a cyclic redundancy check (CRC), or more powerful identifiers such as error code correction (ECC), are conceivable. As compared with a defined division of the message memory, the following advantages are obtained:

The user can decide, upon programming, whether he or she wishes to use a larger number of messages having a small data field, or a smaller number of messages having a large data field. When configuring messages having data regions of different sizes, the available memory space is optimally utilized. The user has the ability to use one data memory region in shared fashion for different messages.

If the communication controller is implemented on an integrated circuit, the size of the message memory can be adapted to the needs of the application by adapting the memory depth of the memory being used, without modifying the other functions of the communication controller.

Host CPU access, i.e., the writing and reading of configuration data or status data and actual data via buffer memory assemblage 201 and 202, will now be described in more detail with references to FIGS. 4 to 6 and 7 to 9. The goal is to create a decoupling in terms of data transfer so as simultaneously to ensure data integrity and guarantee a high transfer speed. These procedures are controlled via message handler 200, which is described in further detail in FIGS. 10, 11, and 12.

Figure 4:
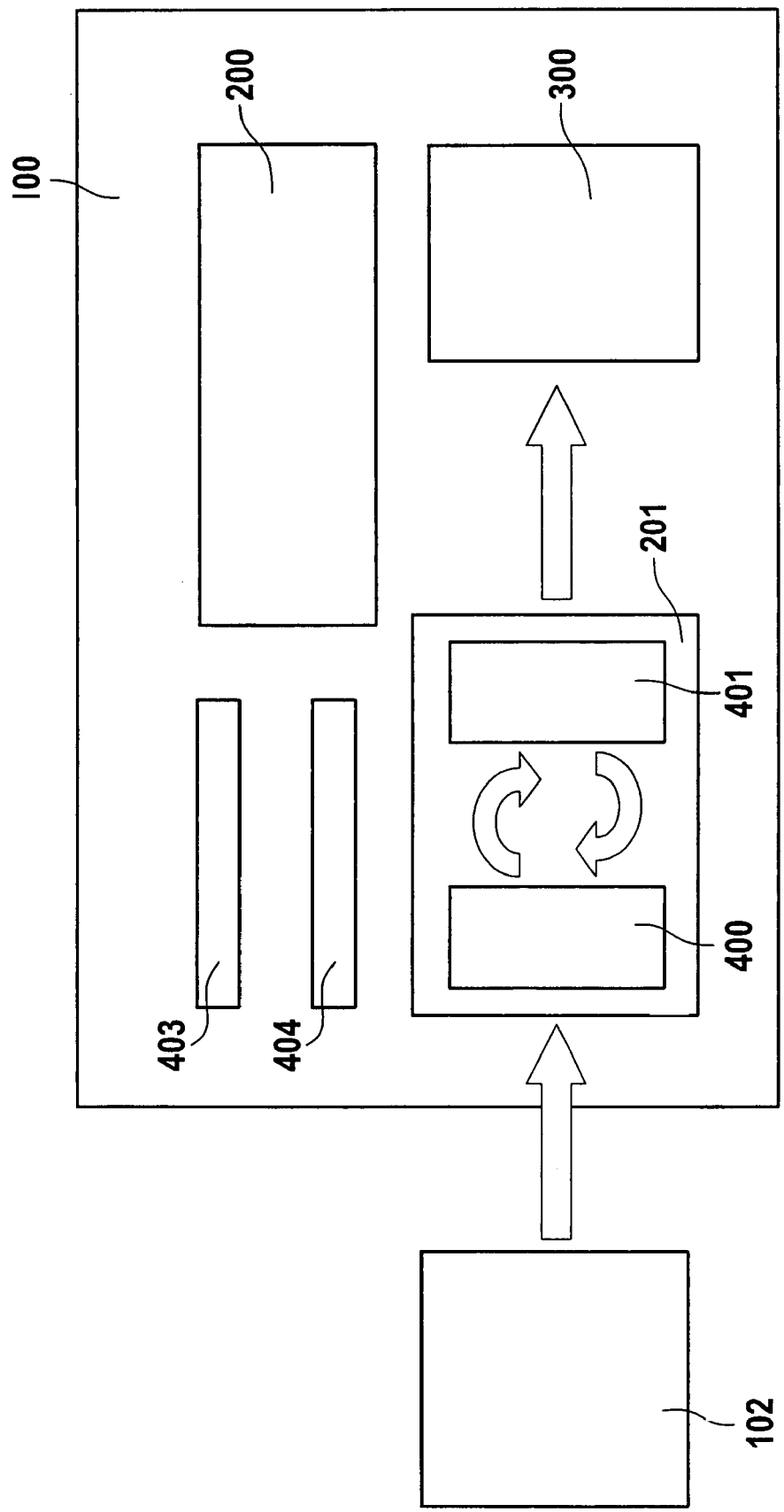
FIG. 4 schematically illustrates the architecture involved in data access in the direction from the subscriber to the message memory.
Figure 5:
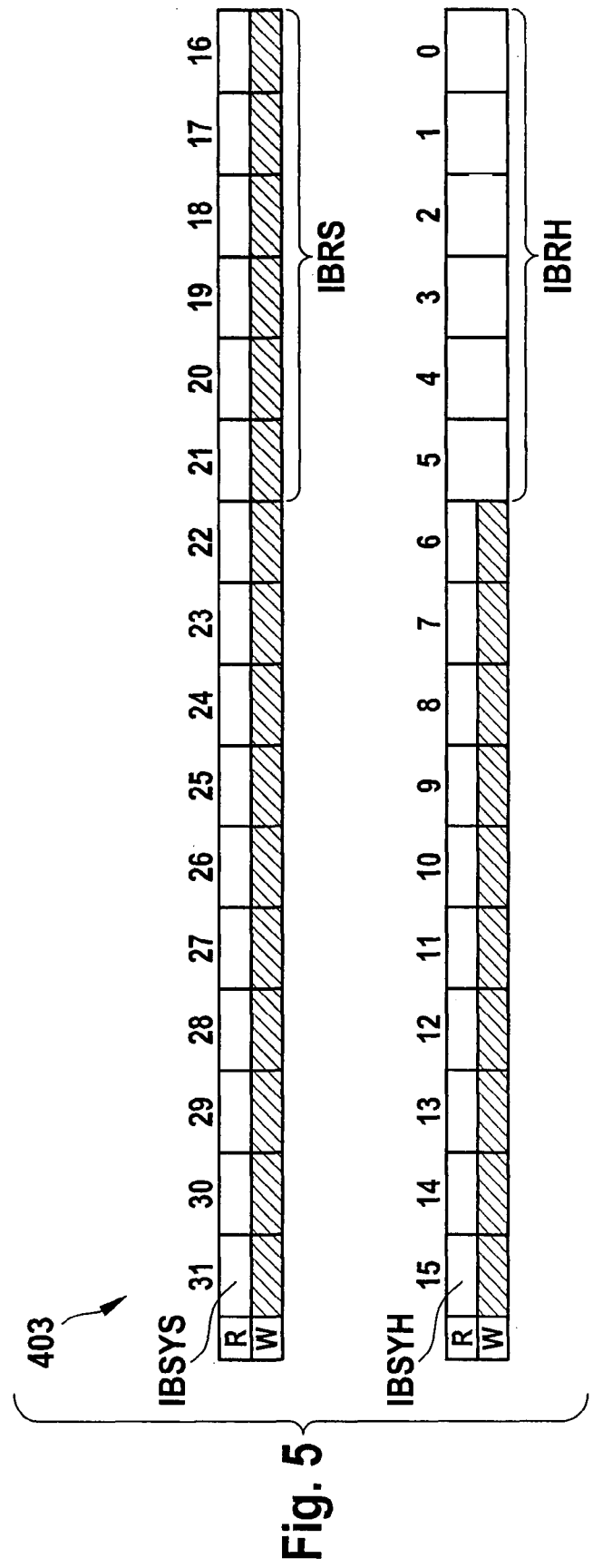
FIGS. 5 and 6 schematically illustrate the register configurations involved in data access acording to FIG. 4.
Figure 6:
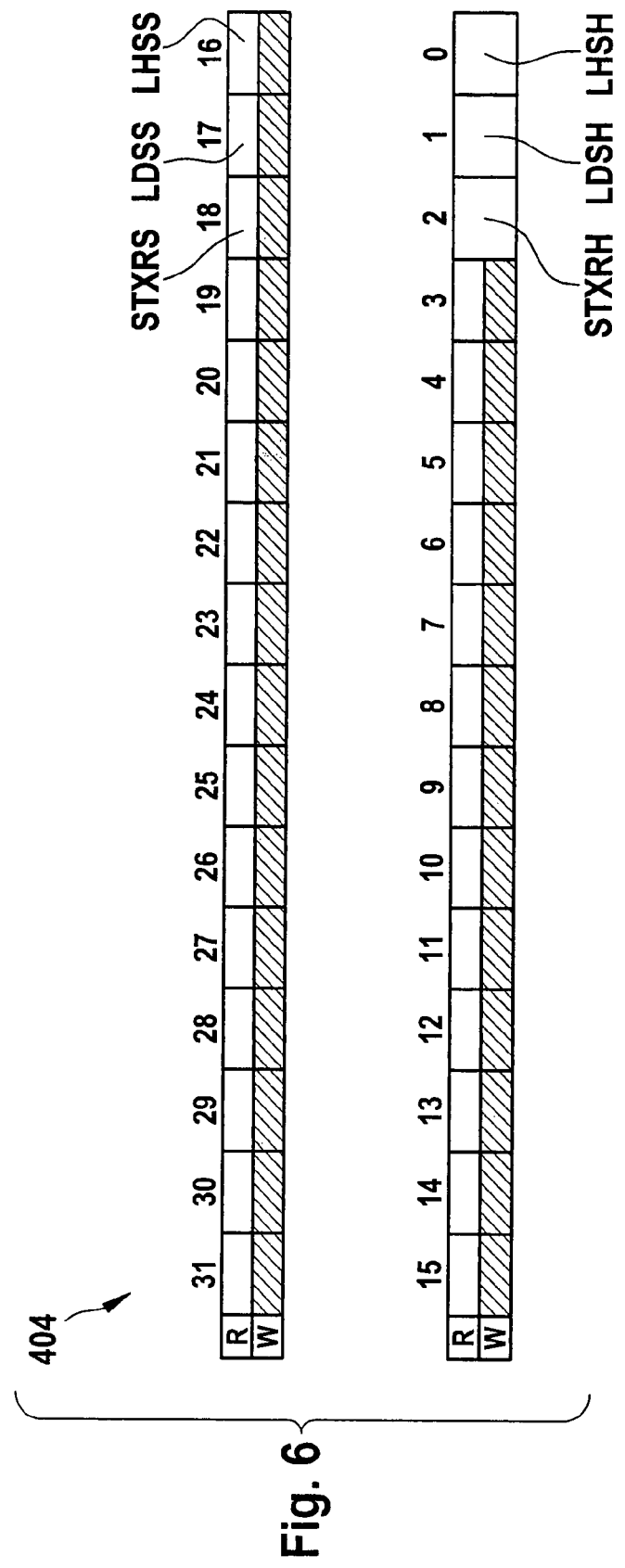

FIGS. 4, 5, and 6 illustrate in more detail the write accesses to message memory 300 by the host CPU or subscriber CPU 102 via input buffer memory 201. For this purpose FIG. 4 shows communication module 100, only the parts of communication module 100 relevant here being shown for the sake of clarity. These parts are on the one hand message handler 200 responsible for execution control, as well as two control registers 403 and 404 that can be housed, as depicted, outside message handler 200 in communication module 100, but can also be contained in message handler 200 itself. The number 403 represents the input request register (input buffer command request register), and 404 the input mask register (input buffer command mask register). Write accesses by host CPU 102 to message memory (message RAM) 300 thus occur via an interposed input buffer memory 201. This input buffer memory 201 is designed in split or double fashion, specifically as partial buffer memory 400 and a shadow memory 401 associated with the partial buffer memory. The result is that, as described below, a continuous access by host CPU 102 to the data of message memory 300 respecting the messages or message objects can occur, thus guaranteeing data integrity and accelerated transfer. The accesses are controlled via input request register 403 and input mask register 404. In register 403, the numbers from 0 to 31 represent the respective bit positions in 403, in this example for a 32-bit width. The same applies to register 404 and to bit positions 0 to 31 in 404.

According to the present invention, in this example bit positions 0 to 5, 15, 16 to 21, and 31 of register 403 have a particular function in terms of execution control. For example, an IBRH (input buffer request host) identifier can be entered into bit positions 0 to 5 of register 403. Similarly, an IBRS (input buffer request shadow) identifier can be entered into bit positions 16 to 21 of register 403. IBSYH can likewise be entered into register position 15 of 403, and IBSYS into register position 31 of 403, as access identifiers. Positions 0 to 2 of register 404 are also distinguished, further identifiers—LHSH (load header section host) and LDSH (load data section host)—being entered into 0 and 1 as data identifiers. These data identifiers are embodied here in the simplest form, namely as one bit each. A start identifier constituted by STXRH (set transmission X request host) is entered into bit position 2 of register 404.

The execution of a write access to the message memory via the input buffer will now be described.

Host CPU 102 writes into input buffer memory 201 the data of the message to be transferred. Host CPU 102 may write only the configuration and header data KD of a message, for header segment HS of the message memory; or only the actual data D of a message to be transferred, for data segment DS of the message memory; or both. The special data identifiers LHSH and LDSH in input mask register 404 define which portion of a message, i.e., configuration data and/or the actual data, is to be transferred. LHSH (load header section host) defines whether the header data, i.e., the configuration data KD, are transferred; and LDSH (load data section host) defines whether the data D are to be transferred. Because input buffer memory 201 is embodied in two parts, with a portion of buffer memory 400 and a shadow memory 401 associated therewith, and because the intention is for reciprocal access to occur, two further data identifier regions are provided as counterparts to LHSH and LDSH and are referred to shadow memory 401. These data identifiers in bit positions 16 and 17 of register 404 are designated LHSS (load header section shadow) and LDSS (load data section shadow). These therefore control the transfer operation with regard to shadow memory 401.

If the start bit or start identifier STXRH (set transmission X request host) in bit position 2 of input mask register 404 is set, then once the particular configuration data and/or actual data to be transferred into message memory 300 have in fact been transferred, a transmission request for the corresponding message object is automatically set. In other words, this start identifier STXRH controls (in particular, starts) the automatic transmission of a message object that is to be transferred.

The corresponding counterpart to this for the shadow memory is the start identifier STXRS (set transmission X request shadow) which is contained, for example, in bit position 18 of input mask register 404 and here as well is embodied, in the simplest case, as a single bit. The function of STXRS is analogous to the function of STXRH, except with reference to shadow memory 1.

When host CPU 102 writes the message identifier, in particular the number of the message object in message memory 300 into which the data of input buffer memory 201 are to be transferred, into bit positions 0 to 5 of input request register 403, i.e., after IBRH, partial buffer memory 400 of input buffer member 201 and the associated shadow memory 401 are transposed, or the respective accesses by host CPU 102 and message memory 300 to the two partial memories 400 and 401 are transposed, as indicated by the semicircular arrows. In that context, for example, the data transfer to message memory 300 is also started. The data transfer to message memory 300 itself is accomplished from shadow memory 401. At the same time, register regions IBRH and IBRS are exchanged. LHSH and LDSH are likewise exchanged for LHSS and LDSS. STXRH is similarly exchanged with STXRS. IBRS thus indicates the identifier of the message, i.e., the number of the message object for which a transfer from shadow memory 401 is in progress, or indicates which message object, i.e., which region in the message memory, was the last to contain data (KD and/or D) from shadow memory 401. The IBSYS (input buffer busy shadow) identifier (in this case once again, for example, one bit) in bit position 31 of input request register 403 indicates whether a transfer involving shadow memory 401 is currently taking place. If IBSYS=1, for example, a transfer is currently occurring from shadow memory 401, and if IBSYS=0, it is not. This IBSYS bit is set, for example, by the writing of IBRH, i.e., bit positions 0 to 5, into register 403, in order to indicate that a transfer between shadow memory 401 and message memory 300 is in progress. After the completion of this data transfer to message memory 300, IBSYS is reset.

While the data transfer from shadow memory 401 is taking place, host CPU 102 can write into the input buffer memory, or into partial buffer memory 400, the next message to be transferred. The identification can be even further refined using a further access identifier IBSYH (input buffer busy host), for example in bit position 15 of register 403. If host CPU 102 is currently writing IBRH, i.e., bit positions 0 to 5 of register 403, while a transfer between shadow memory 401 and message memory 300 is proceeding, i.e., if IBSYS=1, then IBSYH is set in input request register 403. As soon as the current transfer is complete, the requested transfer (requested via STXRH; see above) is started, and the IBSYH bit is reset. The IBSYS bit remains set for the entire time, in order to indicate that data are being transferred to the message memory. All the bits used in all the example embodiments can also be embodied as identifiers having more than one bit. A one-bit solution is advantageous for reasons of memory and processing economy.

The mechanism just described allows host CPU 102 to transfer data continuously into the message objects, made up of header region HB and data region DB, located in the message memory, provided the access speed of host CPU 102 to the input buffer memory is less than or equal to the internal data transfer rate of the FlexRay IP module, i.e., of communication module 100.

Figure 7:
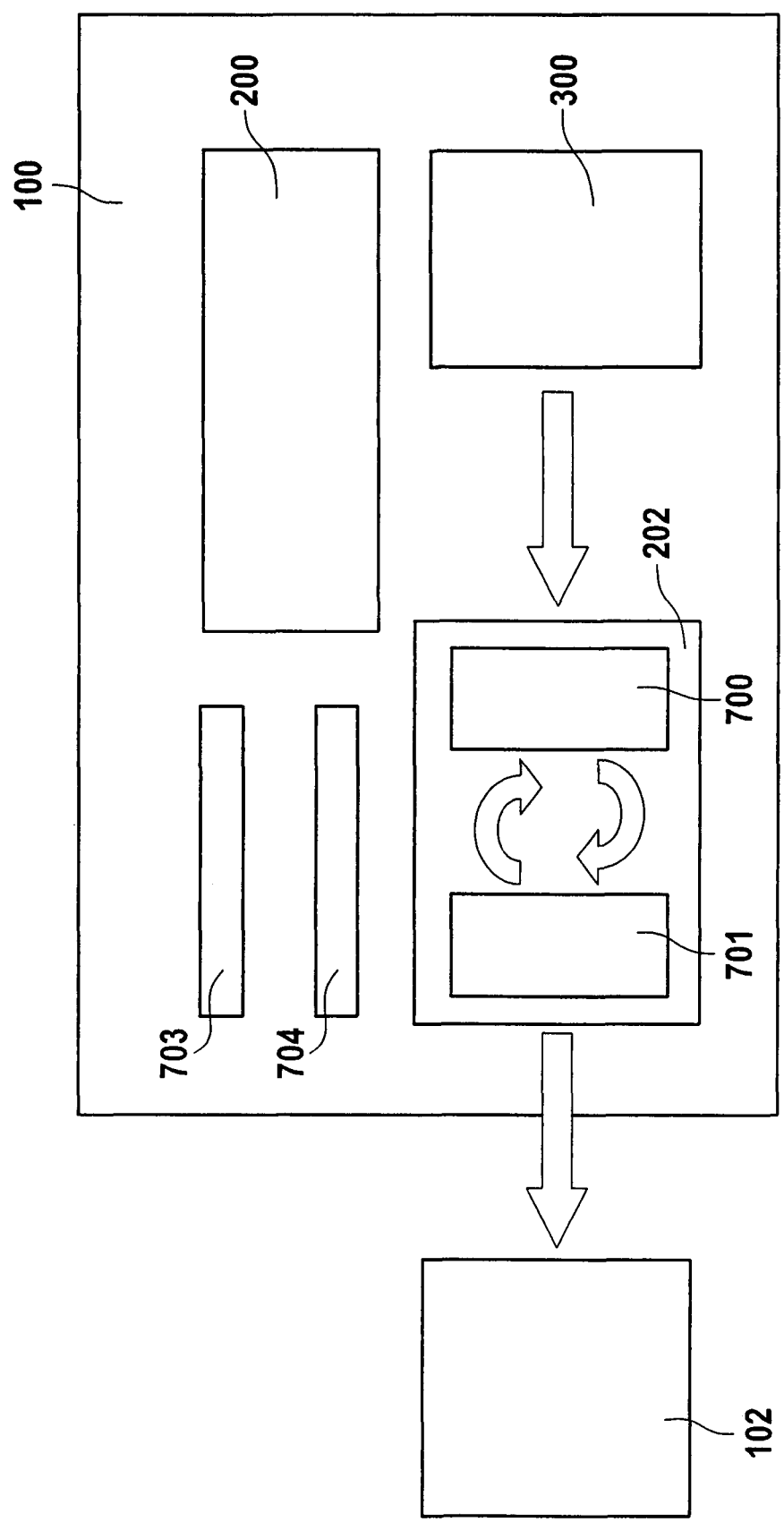
FIG. 7 schematically illustrates the architecture involved in data access in the direction from the message memory to the subscriber.
Figure 8:
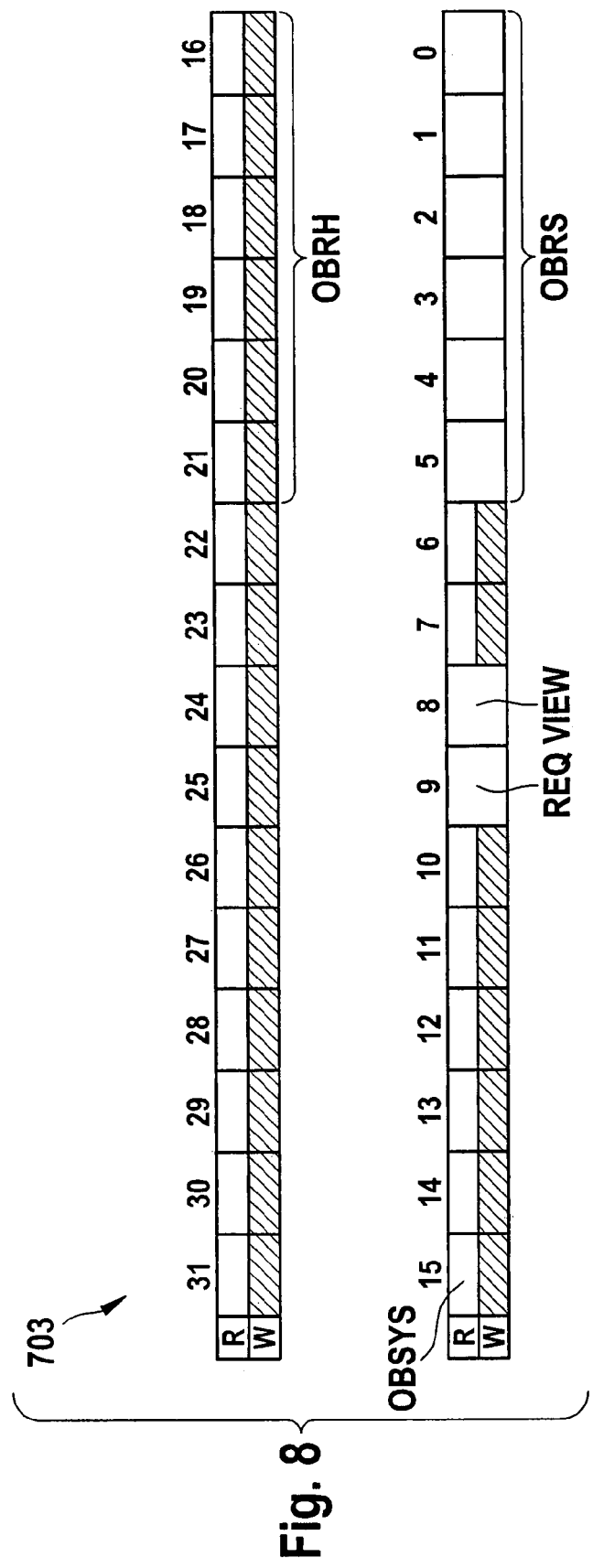
FIGS. 8 and 9 schematically illustrate the register configuration involved in data access according to FIG. 7.
Figure 9:
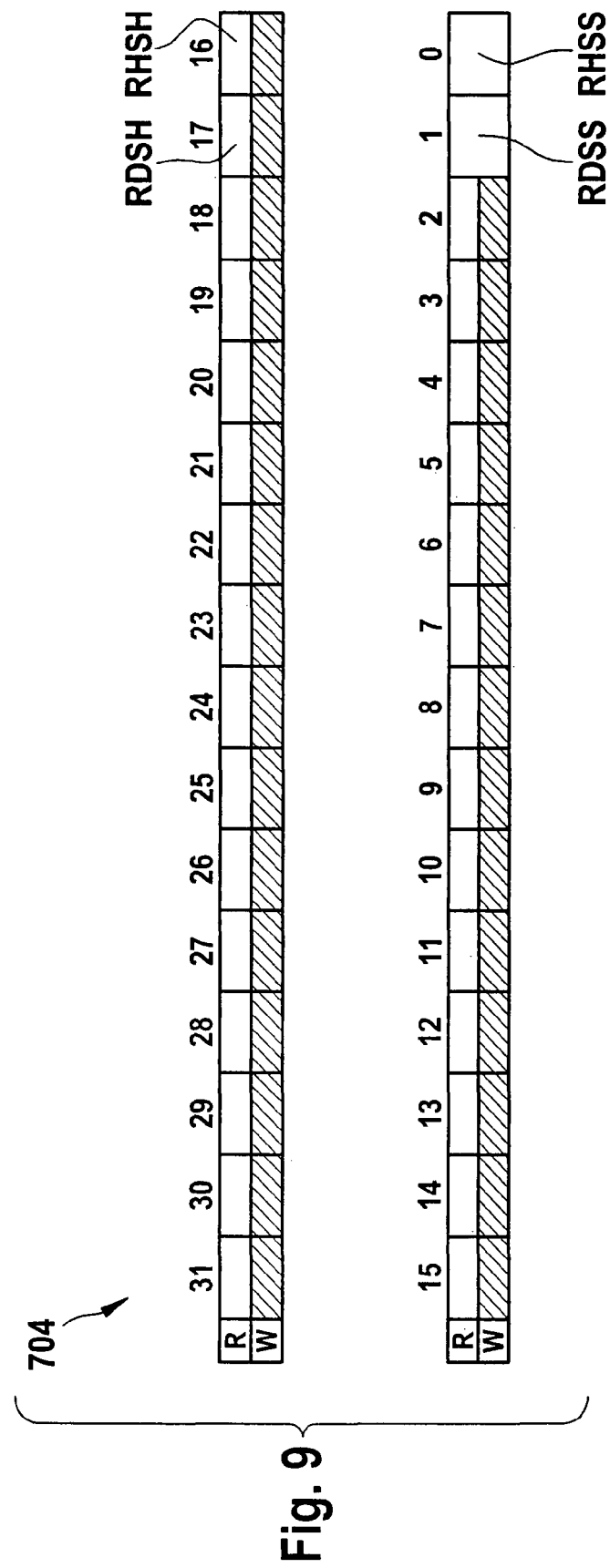

FIGS. 7, 8, and 9 explain in more detail the read accesses to message memory 300 by the host CPU or subscriber CPU 102 via output buffer memory 202. For this purpose FIG. 7 shows communication module 100, here again only the relevant parts of communication module 100 being shown for the sake of clarity. These parts are on the one hand message handler 200 responsible for execution control, as well as two control registers 703 and 704 that can be housed, as depicted, outside message handler 200 in communication module 100, but can also be contained in message handler 200 itself. The number 703 represents the output request register (output buffer command request register), and 704 the output mask register (output buffer command mask register). Read accesses by host CPU 102 to message memory 300 thus occur via the interposed output buffer memory 202. This output buffer memory 202 is likewise designed in split or double fashion, specifically as partial buffer memory 701 and a shadow memory 700 associated with the partial buffer memory. The result is that here again, as described below, a continuous access by host CPU 102 to the data of message memory 300 respecting the messages or message objects can occur, thus guaranteeing data integrity and accelerated transfer in the opposite direction, from the message memory to the host. The accesses are controlled via output request register 703 and output mask register 704. In register 703 as well, the numbers from 0 to 31 represent the respective bit positions in 703, in this example for a 32-bit width. The same applies to register 704 and bit positions 0 to 31 in 704.

According to the present invention, in this example bit positions 0 to 5, 8 and 9, 15, and 16 to 21 of register 703 have a particular function in terms of execution control for read access. For example, an OBRS (output buffer request shadow) identifier can be entered into bit positions 0 to 5 of register 703 as a message identifier. Similarly, an OBRH (output buffer request host) identifier can be entered into bit positions 16 to 21 of register 703. An OBSYS (output buffer busy shadow) identifier can be entered into bit position 15 of register 703 as an access identifier. Positions 0 and 1 of register output mask register 704 are also distinguished, further identifiers—RDSS (read data section shadow) and RHSS (read header section shadow)—being entered into bit positions 0 and 1 as data identifiers. Further data identifiers—RDSH (read data section host) and RHSH (read header section host)—are provided, for example, in bit positions 16 and 17. Here again, these data identifiers are embodied by way of example in the simplest form, namely as one bit each. A start identifier (REQ) is entered into bit position 9 of register 703. A switchover identifier (VIEW) is furthermore provided, and is entered, e.g., in bit position 8 of register 703.

Host CPU 102 requests the data of a message object from message memory 300 by writing the identifier of the desired message, i.e., in particular the number of the desired message object, after OBRS, i.e., into bit positions 0 to 5 of register 703. Here as well, as in the opposite direction, the host CPU can read either only the status or configuration data and header data KD of a message, i.e., from a header region; or only the actual data D of a message that are to be transferred, i.e., from the data region; or both. In comparable fashion to the opposite direction, therefore, RHSS and RDSS define which part of the data (i.e., from the header region and/or data region) is to be transferred. In other words, RHSS indicates whether the header data are to be read, and RDSS indicates whether the actual data are to be read.

A start identifier serves to start the transfer from the message memory to shadow memory 700. In other words, if what is used as the identifier (as in the simplest case) is one bit, the setting of the REQ bit in bit position 9 in output request register 703 starts the transfer from message memory 300 to shadow memory 700. An access identifier—here again, in the simplest case, an OBSYS bit in register 703—once again indicates that a transfer is underway. To avoid collisions, it is advantageous if the REQ bit can be set only if OBSYS is not set, i.e., if a transfer is not currently underway. Here as well, the message transfer then takes place between message memory 300 and shadow memory 700. The actual execution could on the one hand be controlled (complementary register loading) and implemented in a manner comparable to the opposite direction, as described with reference to FIGS. 4, 5, and 6; or, in a variation, by way of an additional identifier, namely a switchover identifier (VIEW) in bit position 8 of register 703. In other words, after completion of the transfer, the OBSYS bit is reset, and the setting of the VIEW bit in output request register 703 causes partial buffer memory 701 and the associated shadow memory 700 to be exchanged, or the accesses thereto to be exchanged, and host CPU 102 can then read the message object (i.e., the corresponding message) requested by the message memory out of partial buffer memory 701. Here again, in a manner comparable to the opposite transfer direction in FIGS. 4 to 6, register cells OBRS and OBRH are exchanged. In the same fashion, RHSS and RDSS are exchanged for RHSH and RDSH. Here again, as a protective mechanism, provision can be made that the VIEW bit can be set only if OBSYS is not set, i.e., if a current transfer is not occurring.

Read accesses by host CPU 102 to message memory 300 thus occur via an interposed output buffer memory 202. This output buffer memory is, like the input buffer memory, designed in double or two-part fashion in order to ensure continuous access by host CPU 102 to the message objects stored in message memory 300. Here again, the advantages of high data integrity and accelerated transfer are achieved.

The use of the above-described input and output buffers ensures that a host CPU can access the message memory without interruption despite latency times within the module.

Figure 10:
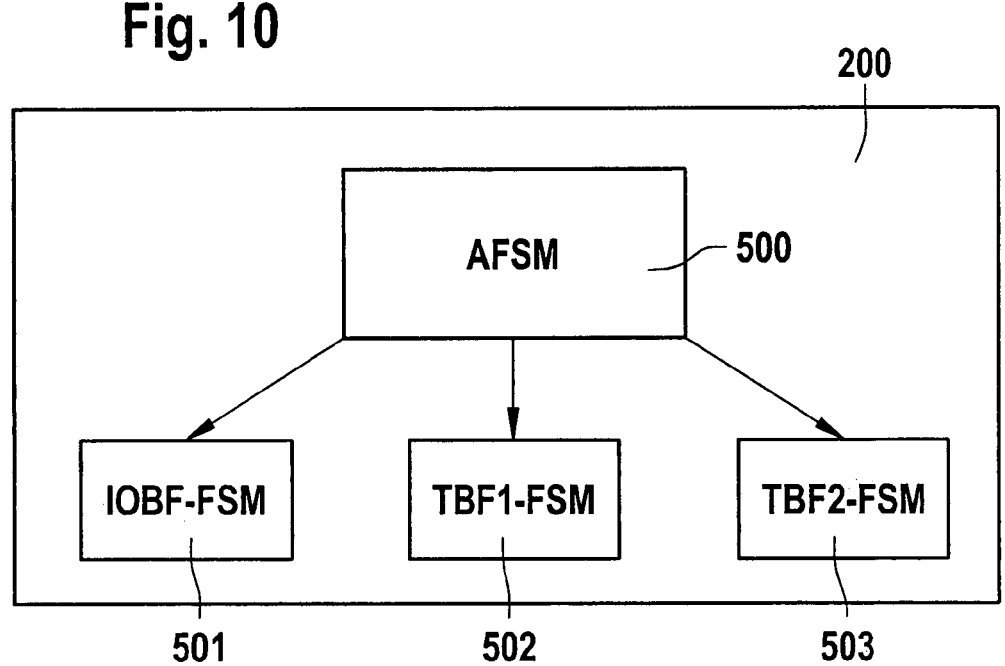
FIG. 10 schematically depicts the message handler and the finite-state machines contained therein.

To ensure this data integrity, the data transfer, in particular forwarding, in communication module 100 is performed by message handler 200 (MHD) that is depicted for that purpose in FIG. 10. The functionality of the message handler can be represented by several state machines, i.e., so-called finite-state machines (FSM). At least three state machines, and in a particular embodiment four finite-state machines, are provided. A first finite-state machine is the IOBF-FSM (input/output buffer state machine), labeled 501. This IOBF-FSM could also be divided into two finite-state machines for each transfer direction, in terms of the input buffer memory or output buffer memory—IBF-FSM (input buffer FSM) and OBF-FSM (output buffer FSM)—so that a maximum of five finite-state machines (IBF-FSM, OBF-FSM, TBF1-FSM, TBF2-FSM, AFSM) would be conceivable. It is possible, however, to provide one shared IOBF/FSM. An at least second finite-state machine is in this case, in the context of the exemplifying embodiment, divided into two blocks 502 and 503, and operates the two channels A and B with reference to memories 205 and 206, as described under FIG. 2. One finite-state machine can be provided in order to operate both channels A and B; or, as in the preferred form, a finite-state machine TBF1-FSM (transient buffer 1 (206, RAM A) state machine) for channel A is labeled 502, and a finite-state machine TBF2-FSM (transient buffer 2 (205, RAM B) state machine) for channel B is labeled 503.

In the exemplifying embodiment, an arbiter finite-state machine (AFSM), labeled 500, serves to control access by the three finite-state machines 501 to 503. The data (KD and/or D) are transferred in the communication module according to a cycle time generated by a timing means—for example a voltage-controlled oscillator (VCO), a quartz oscillator, etc.—or derived therefrom. Cycle time T can be generated in the module or can be defined from outside, e.g., as the bus cycle time. This arbiter finite-state machine AFSM 500 gives access to the message memory to one of the three finite-state machines 501 to 503 in turn, in particular for a cycle time period T in each case. In other words, the time that is available is divided up, in accordance with the access requests of the individual state machines 501, 502, 503, among these requesting state machines. If an access request is being made by only one finite-state machine, it then receives 100% of the access time, i.e., all the cycle times T. If an access request is made by two finite-state machines, each one receives 50% of the access time. Lastly, if an access request is made by three finite-state machines, each of them then receives one-third of the access time. The result is that the bandwidth available in each instance is optimally utilized.

The first finite-state machine labeled 501, i.e., IOBF-FSM, performs the following actions as necessary:
  Data transfer from input buffer memory 201 to the selected message object in message memory 300.
  Data transfer from the selected message object in message memory 300 to output buffer memory 202.
The state machine 502 for channel A, i.e., TBIF1-FSM, performs the following actions:
  Data transfer from the selected message object in message memory 300 to buffer memory 206 of channel A.
  Data transfer from buffer memory 206 to the selected message object in message memory 300.
  Search for the matching message object in the message memory: in the context of reception, the message object (receive buffer) for storage of a message received on channel A is searched for in the context of an acceptance filtering function; and in the context of transmission, the next message object to be transmitted on channel A (transmit buffer) is searched for.

The action of TBF2-FSM, i.e., the finite-state machine for channel B in block 503, is analogous to this. This machine performs data transfer from the selected message object in message memory 300 to buffer memory 205 of channel B, and data transfer from buffer memory 205 to the selected message object in message memory 300. The search function for a matching message object in the message memory is also analogous to TBF1-FSM: in the context of reception, the message object (receive buffer) for storage of a message received on channel B is searched for in the context of an acceptance filtering function; and in the context of transmission, the next message or message object to be transmitted on channel B (transmit buffer) is searched for.

Figure 11:
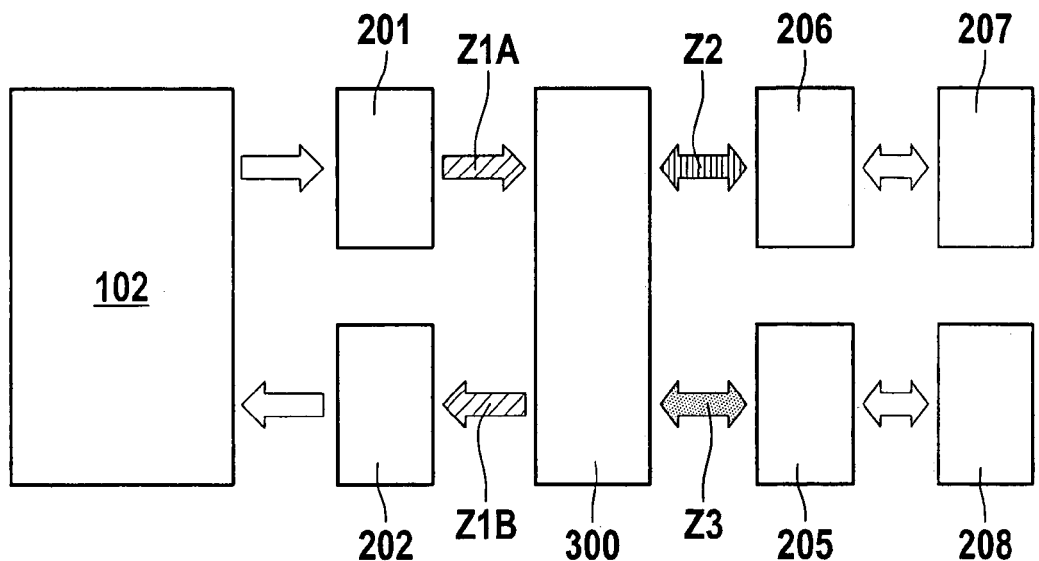
FIG. 11 schematically illustrates the components of the communication module, as well as the subscriber and the corresponding data paths controlled by the message handler.

FIG. 11 once again depicts operations and transfer paths. The three state machines 501 to 503 control the respective data transfers between the individual parts; 102 again denotes the host CPU, 201 the input buffer memory, and 202 the output buffer memory. The number 300 denotes the message memory, and the two buffer memories for channel A and channel B are labeled 206 and 205. Interface elements 207 and 208 are also depicted. The first state machine IOBF-FSM, labeled 501, controls data transfers Z1A and Z1B, i.e., from input buffer memory 201 to message memory 300 and from message memory 300 to output buffer memory 202. The data transfer is accomplished via data buses having a word width of, for example, 32 bits; any other number of bits is also possible. The same applies to transfer Z2 between message memory and buffer memory 206. This data transfer is controlled by TBF1-FSM, i.e., 502, the state machine for channel A. Transfer Z3 between message memory 300 and buffer memory 205 is controlled by state machine TBF2-FSM, i.e., 503. Here as well, the data transfer takes place via data buses having a word width of, for example, 32 bits, any other number of bits once again also being possible. The transfer of a complete message object via the aforesaid transfer paths normally requires several cycle time periods T. A division of the transfer time in terms of cycle time periods T is therefore performed by the arbiter, i.e., AFSM 500. FIG. 11 thus depicts the data pathways between the memory components controlled by the message handler. To ensure the data integrity of the message objects stored in the message memory, advantageously data should be simultaneously exchanged on only one of the pathways depicted, i.e. Z1A and Z1B, and Z2 and Z3, at the same time.

Figure 12:
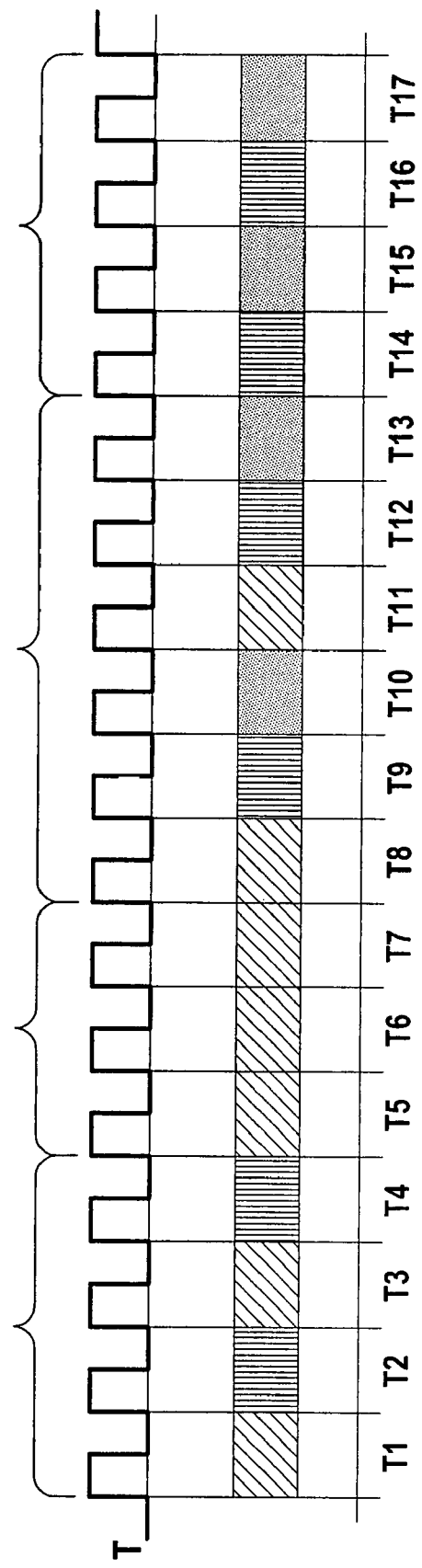
FIG. 12 illustrates access distribution in terms of the data paths shown in FIG. 11.

FIG. 12 indicates, using an example, how the system cycle times T that are available are divided by the arbiter, i.e., AFSM 500, among the three requesting state machines. In phase 1, access requests occur from state machine 501 and state machine 502, meaning that the entire time is divided, half to each, among the two requesting state machines. In terms of the cycle time periods in phase 1, this means that state machine 501 obtains access in cycle time periods T1 and T3, and state machine 502 in cycle time periods T2 and T4. In phase 2, access is effected only by state machine 501, so that all three cycle time periods, i.e., 100% of the access time from T5 to T7, is given to IOBF-FSM. In phase 3, access requests are made by all three state machines 501 to 503, so that the overall access time is divided into thirds. Arbiter AFSM then distributes the access time, for example, in such a way that finite-state machine 501 obtains access in cycle time periods T8 and T11, finite-state machine 502 in cycle time periods T9 and T12, and finite-state machine 503 in cycle time periods T10 and T13. Lastly, in phase 4 access to the two channels A and B of the communication module occurs on the part of two state machines 502 and 503, so that an access distribution of cycle time periods T14 and T16 to finite-state machine 502, and T15 and T17 to finite-state machine 503, is performed.

The arbiter state machine AFSM 500 thus ensures that when more than one of the three state machines makes a request for access to message memory 300, access is divided in cycle-timed and alternating fashion among the requesting state machines. This procedure ensures the integrity of the message objects stored in the message memory, i.e., ensures data integrity. For example, if host CPU 102 wishes to read out a message object via output buffer memory 202 at the same time as a received message is being written into that message object, then either the old state or the new state is read out, depending on which request was started first, but the accesses in the message object in the message memory do not themselves collide.

The method according to the present invention described above allows the host CPU, during operation, to read or write any desired message object from or into the message memory without causing the selected message object to be excluded, for the duration of the host CPU's access, from participating in the data exchange on both channels of the FlexRay bus (buffer locking). At the same time, the cycle-timed interweaving of the accesses ensures the integrity of the data stored in the message memory, and increases the transfer speed by, inter alia, utilizing the entire bandwidth.

What is claimed is:

1. A method for one of inputting data into a message memory of a communication module and outputting data from the message memory of the communication module, the method comprising:
    providing a connection between the message memory and a buffer memory assemblage, wherein data is configured to be transferred in a first transfer direction to the message memory and in a second transfer direction from the message memory, wherein the buffer memory assemblage has an input buffer memory in the first transfer direction and an output buffer memory in the second transfer direction, and wherein the input buffer memory and the output buffer memory are each divided into a partial buffer memory and a shadow memory;
    providing a defined register including a first message identifier for a message stored in the partial buffer memory and a second message identifier for a message stored in the shadow memory; and
    for each transfer direction, performing:
        inputting the data into the respective partial buffer memory; and
        transposing access to the partial buffer memory and the shadow memory, so that subsequent data is enabled to be inputted into the shadow memory while the previously inputted data is being transferred from the partial buffer memory in the corresponding transfer direction,
    wherein the data are transferred in a message that is provided with the first message identifier, and wherein the transposition of access to the partial buffer memory and the shadow memory occurs when the first message identifier is written into the defined register; and
    upon the transposition of access to the partial buffer memory and the shadow memory, transposing access to the first message identifier and the second message identifier in the defined register.

2. The method as recited in claim 1, wherein the transposition of access to the partial buffer memory and the shadow memory is indicated by an identifier.

3. The method as recited in claim 1, wherein the transposition of access to the partial buffer memory and the shadow memory is initiated by an identifier.

4. The method as recited in claim 1, wherein data are transferred in a message that is divided into at least a first data field and a second data field, and wherein selected data in at least one of the first data field and the second data field are transferred as a function of at least one data identifier.

5. The method as recited in claim 1, wherein the one of inputting data into the message memory of the communication module and outputting data from the message memory of the communication module is indicated by an access identifier that is entered in a register.

6. The method as recited in claim 4, wherein information regarding which one of the partial buffer memories and the shadow memories is currently being accessed is ascertained based on one of the access identifier and a position of the access identifier in the register.

7. The method as recited in claim 1, wherein the transposition of access to the partial buffer memory and the shadow memory is initiated by a switchover identifier.

8. The method as recited in claim 1, wherein for at least one transfer direction, a start identifier is entered in a register when data are sought to be written into a memory.

9. A method for accessing data of a message memory, comprising:
   providing a buffer memory, wherein the buffer memory is divided into a partial buffer memory and a shadow memory;
   providing a defined register including a first message identifier for a message stored in the partial buffer memory and a second message identifier for a message stored in the shadow memory;
   accessing the data of the message memory;
   upon the accessing of the data of the message memory, inputting data into the partial buffer memory; and
   transposing access to the partial buffer memory and the shadow memory, so that subsequent data is enabled to be inputted into the shadow memory while the previously inputted data is being transferred from the partial buffer memory,
   wherein the data are transferred in a message that is provided with the first message identifier, and wherein the transposition of access to the partial buffer memory and the shadow memory occurs when the first message identifier is written into the defined register; and
   upon the transposition of access to the partial buffer memory and the shadow memory, transposing access to the first message identifier and the second message identifier in the defined register.

10. A buffer memory assemblage for accessing data of a message memory of a communication module, comprising:
    an input buffer memory having a first partial buffer memory and a first shadow memory;
    an output buffer memory having a second partial buffer memory and a second shadow memory;
    a defined register including a first message identifier for a message stored in the partial buffer memory and a second message identifier for a message stored in the shadow memory;
    a first transposing arrangement for transposing access to the first partial buffer memory and the first shadow memory; and
    a second transposing arrangement for transposing access to the second partial buffer memory and the second shadow memory,
    wherein data are transferred in a message that is provided with the first message identifier to the input buffer memory, and wherein the transposition of access to the first partial buffer memory and the first shadow memory occurs when the first message identifier is written into the defined register, and upon the transposition of access to the partial buffer memory and the shadow memory, access to the first message identifier and the second message identifier in the defined register is transposed.

11. A buffer memory for accessing data of a message memory of a communication module via a message memory handler, comprising:
    a partial buffer memory;
    a shadow memory corresponding the partial buffer memory;
    a defined register including a first message identifier for a message stored in the partial buffer memory and a second message identifier for a message stored in the shadow memory; and
    a transposing arrangement for transposing access to the partial buffer memory and the shadow memory,
    wherein data are transferred in a message that is provided with the first message identifier to the buffer memory, and wherein the transposition of access to the partial buffer memory and the shadow memory occurs when the first message identifier is written into the defined register, and upon the transposition of access to the partial buffer memory and the shadow memory, access to the first message identifier and the second message identifier in the defined register is transposed.

* * * * *